(12) United States Patent
Lamkemeyer et al.

(10) Patent No.: US 9,163,966 B2
(45) Date of Patent: Oct. 20, 2015

(54) MEASURING DEVICE FOR DETERMINING THE VOLUMETRIC FLOW RATE OF GLUE IN A GLUING DEVICE

(71) Applicant: Windmöller & Hölscher KG, Lengerich (DE)

(72) Inventors: Andreas Lamkemeyer, Georgsmarienhütte (DE); Achim Seeberger, Lengerich (DE)

(73) Assignee: Windmöller & Hölscher KG, Lengerich (DE)

( * ) Notice: Subject to any disclaimer, the term of this patent is extended or adjusted under 35 U.S.C. 154(b) by 0 days.

(21) Appl. No.: 14/364,728

(22) PCT Filed: Dec. 6, 2012

(86) PCT No.: PCT/EP2012/074697
§ 371 (c)(1),
(2) Date: Jun. 12, 2014

(87) PCT Pub. No.: WO2013/087519
PCT Pub. Date: Jun. 20, 2013

(65) Prior Publication Data
US 2015/0096386 A1    Apr. 9, 2015

(30) Foreign Application Priority Data

Dec. 13, 2011 (DE) .......................... 10 2011 056 357

(51) Int. Cl.
*G01F 1/37* (2006.01)
*G01F 1/50* (2006.01)
*B05C 11/10* (2006.01)
*G01F 1/34* (2006.01)
*G01F 1/38* (2006.01)

(52) U.S. Cl.
CPC .............. *G01F 1/50* (2013.01); *B05C 11/1013* (2013.01); *G01F 1/34* (2013.01); *G01F 1/38* (2013.01)

(58) Field of Classification Search
None
See application file for complete search history.

(56) References Cited

U.S. PATENT DOCUMENTS 3,745,338 A * 7/1973 Joyce ............................ 250/303
4,555,952 A * 12/1985 Jenkins ....................... 73/861.47
(Continued)

FOREIGN PATENT DOCUMENTS

| DE | 10065608 | 8/2001 |
|----|----------|--------|
| DE | 20318476 | 4/2004 |

(Continued)

OTHER PUBLICATIONS

International Preliminary Report on Patentability Dated Jun. 17, 2014 From the International Bureau of WIPO Re. Application No. PCT/EP2012/074697 and its Translation into English.

(Continued)

*Primary Examiner* — Harshad R Patel

(57) ABSTRACT

A measuring apparatus (10) for determining the volume flow of glue in a gluing device (100) for an apparatus, particularly a bottoming device or a tubing machine, for manufacturing bags or semifinished bag products. The measuring apparatus (10) comprises a pressure accumulator (20) having a gas volume (22) and a glue volume (24) that is separated from the gas volume (22) by a pressure equalization element (26), particularly a flexible membrane, wherein the glue volume (24) as a glue port (28) for connection to a glue line (110) of the gluing device (100), and the pressure accumulator (20) comprises a pressure sensor (30) for determining the internal pressure inside the pressure accumulator (20).

20 Claims, 4 Drawing Sheets

(56) References Cited

U.S. PATENT DOCUMENTS

| | | | |
|---|---|---|---|
| 4,848,657 A | 7/1989 | Hashimoto et al. | |
| 6,460,730 B1 | 10/2002 | Liedtke | |
| 7,350,423 B2 * | 4/2008 | Long et al. | 73/861.47 |
| 2008/0300586 A1 * | 12/2008 | Zvuloni | 606/22 |
| 2009/0014468 A1 | 1/2009 | Byers | |
| 2009/0178491 A1 * | 7/2009 | McKitterick et al. | 73/861.47 |
| 2009/0246575 A1 * | 10/2009 | Zhao et al. | 429/19 |

FOREIGN PATENT DOCUMENTS

| | | |
|---|---|---|
| DE | 202005018866 | 2/2006 |
| DE | 102005044796 | 3/2007 |
| EP | 1683582 | 7/2006 |
| EP | 1854548 | 11/2007 |
| WO | WO 2005/002838 | 1/2005 |
| WO | WO 2013/087519 | 6/2013 |

OTHER PUBLICATIONS

Request for Examination Dated Jul. 2, 2014 From the German Patent and Trademark Office Re. Application No. 102011056357.1 and its Translation into English.

International Search Report and the Written Opinion Dated Apr. 10, 2013 From the International Searching Authority Re. Application No. PCT/EP2012/074697.

* cited by examiner

MEASURING DEVICE FOR DETERMINING THE VOLUMETRIC FLOW RATE OF GLUE IN A GLUING DEVICE

RELATED APPLICATIONS

This application is a National Phase of PCT Patent Application No. PCT/EP2012/074697 having International filing date of Dec. 6, 2012, which claims the benefit of priority of German Patent Application No. 10 2011 056 357.1 filed on Dec. 13, 2011. The contents of the above applications are all incorporated by reference as if fully set forth herein in their entirety.

FIELD AND BACKGROUND OF THE INVENTION

The present invention relates to a measuring apparatus for determining the volume of glue in a gluing device of an apparatus, particularly a bottoming or tubing machine, for manufacturing bags and semifinished bag products. The present invention further relates to a gluing device for such an apparatus and a method for determining the volume flow of glue in a gluing device.

It is known to use gluing devices for apparatuses, particularly bottoming or tubing machines, that serve to manufacture bags or semifinished bag products. In such processes, for example material webs are glued to form tubes or tubular webs are cut and the bottoms are laid and glued. In both cases, materials must be glued together. For this, glue must be applied to the material of the bag or semifinished bag product in defined manner and as accurately as possible. Gluing devices are usually equipped with application heads and application valves. This allows the glue to be applied both in the direction of application and to some degree perpendicularly to the direction of application by methods of varying complexity. Such an application device is known for example from International Publication No. WO 2005/002838. In that document, a bottoming device for paper bags is described that produces the bottoms for such paper bags by gluing. For applying the glue, it is important to set the volume flow of the glue as precisely as possible, so that the application, particularly the application thickness of the glue, remains as consistent as possible with a predefined reference value. In known gluing apparatuses in this context, it is typical to use a flowmeter, particularly a flowmeter with a relatively limited measuring range, as the measuring apparatus.

A disadvantage of known gluing devices and the corresponding measuring apparatuses is that they are in direct contact with the glue. Thus, although this offers a relatively accurate option for measuring the desired flow rate, on the other hand the direct measurement of the volume flow rate also entails influencing the flow at least to some degree. In addition, such direct measurement methods of the volume flow typically require relatively expensive sensors. Accordingly, known measuring apparatuses for direct measurement lead to influencing of the volume flow and higher costs.

SUMMARY OF THE INVENTION

It is an object of the present invention to overcome the disadvantages described above, at least in part. In particular, it is an object of the present invention to provide a measuring apparatus, a gluing device and a method for determining the volume flow of glue, with which the flow rate can be determined in a simple, cost-effective manner.

The foregoing object is solved with a measuring apparatus with a gluing device and with a method as descried above. Further features and details of the invention will become apparent from the dependent claims, the description and the drawings. It should be noted that features and details that are described in connection with the measuring apparatus according to the invention of course apply equally in connection with the method according to the invention and the gluing device according to the invention, and vice versa, so that regarding the disclosure of each individual aspect of the invention, reciprocal reference is and may be made consistently to each of the other aspects.

A measuring apparatus according to the invention is used to determine the volume flow of glue in a gluing device. Such a device is suitable for an apparatus, particularly a bottoming device, or a tubing machine, for the production of bags or semifinished bag products. A measuring apparatus according to the invention enables the volume flow to be determined indirectly. For this purpose, in a measuring apparatus according to the invention a pressure accumulator with a gas volume and a glue volume is provided, wherein the glue volume is separated from the gas volume by a pressure compensation element, particularly a flexible membrane. The pressure compensation element is in particular a pressure compensation element at least portions of which are capable of movement. Such a movable pressure compensation element may be for example a plunger or a plunger head. The plunger or plunger head passes through the walls of the pressure chamber, for example, so that it is able to move in accordance with the pressure equalization in the case of pressure differences. The glue volume has a glue port for connecting to a glue line of the gluing device. The pressure accumulator is also equipped with a pressure sensor for determining the pressure inside the pressure accumulator. Thus, the internal pressure in the pressure accumulator may be determined by means of a measuring apparatus according to the invention. The provision of the pressure compensation element enables this internal pressure in the pressure accumulator to be correlated with the current delivery pressure of the glue in the gluing device. If the delivery of the glue in the gluing device is maintained solely by the pressure in the pressure accumulator and no post-pressurization is carried out, the pressure in the pressure accumulator falls as the delivery continues. This may be achieved for example by the use of a check valve, as a result of which only the residual pressure serves to continue delivery of the glue volume flow. A volume progression over the pressure gradient can also be determined via the drop in pressure. The ideal gas law is used particularly with a measuring apparatus according to the invention in order to determine volume flow. In this context, the fundamental formula $$\frac{p \cdot V}{T} = const.$$

may be used. In particular, with a measuring apparatus according to the invention, two pressures are compared with one another at the beginning and end of a measurement. Thus, for example, residual pressure transport may be started from the pressure accumulator by a check valve, thereby yielding a starting pressure $p_1$. If the measurement is ended, a lower pressure than $p_1$ prevails, the "ultimate pressure $p_2$. The check valve is then opened again, so that the gluing device can function normally. On the basis of the two pressures to be compared, and particularly the precharge pressure $p_0$, and assuming that temperature is not significant for this measurement method (isothermal assumption), the desired differential volume can be calculated using the ideal gas law. In addition, the time difference between the two pressure measurement times is determined for $p_1$ and $p_2$ such that the volume flow of the glue can be determined from the calculated volume differential and the corresponding time difference.

In summary, it is notable that with a measuring apparatus according to the invention it is possible to perform an indirect measurement of the volume flow, that is to say a determination of the volume flow. To this end, a relatively inexpensive and easily manufactured pressure sensor is used, which replaces direct measurement using complex, expensive sensors. To enable this, a design arrangement such as is realised with a measuring apparatus according to the invention is required. In this way, a correlation of at least two pressures can be used, which leads to the possibility of indirectly determining the flow rate of glue in a gluing device.

Generally, of course, a measuring apparatus according to the invention may be used for any viscous, particularly an extremely viscous fluid. It goes without saying, any other adhesive substance or indeed any other viscous fluid may be provided as a volume flow to be measured in place of glue. In particular, however, it is a viscous liquid, the purpose of which is to create an adhesive bond.

The glue port of a measuring apparatus according to the invention may be designed to be detachable or non-detachable. In particular, in the case of measuring apparatuses that are fitted subsequently on a gluing device, or which are intended to have cleaning capability, it may be expedient to ensure reversible connection capability with the glue port, with a screw thread, for example. However, in operation this port is often not detached, and the measuring apparatus is left in the same place for the whole time the gluing device for the bottoming device or tubing machine is in use.

The pressure compensation element, particularly the flexible membrane, is used in a measuring apparatus according to the invention to ensure that pressure compensation between the gas volume and the glue volume can take place, so that the gas volume, or more precisely the gas therein may be allowed to expand or compressed by corresponding displacement of the pressure compensating element, particularly the flexible membrane. Thus, this pressure accumulator is provided so that continued delivery is assured in the manner according to the invention for carrying out the measurement after shutting off, with a shut-off valve for example, and the residual pressure still stored in the pressure accumulator. For this purpose, the pressure compensation element, particularly the flexible membrane, is preferably pressure-tight, particularly sealed against the glue in the glue volume and against the gas in the gas volume.

A measuring apparatus according to the invention may be further developed in such manner that the pressure sensor is located in or on the gas volume of the pressure accumulator. For this purpose, the pressure accumulator is connected to the gas volume with direct pressure contact, so that it can detect the pressure of the gas. In particular, the advantages offered by this configuration are not only greater ease of installation but also that a measurement can be carried out even in a pressure accumulator that contains no glue. If the gas volume has expanded to a maximum and consequently the glue volume is correspondingly minimal, the pressure accumulator may be said to be empty of glue. In this case the measurement of the pressure sensor is equal to the pre-charge pressure, which is about 10 bar. If a delivery pressure is also applied, a higher pressure is created, which is above the pre-charge pressure and is adjusted automatically because the glue is forced into the glue volume and the gas in the gas volume is compressed. Moreover, such an arrangement enables the pressure sensor to be fastened and mounted particularly easily. For example, a connecting member, particularly with a thread, may be provided, into which a standard pressure sensor can be inserted or screwed. This lowers the cost of a measuring apparatus according to the invention further still.

Of course, it is also possible in addition or instead for the pressure sensor to be located in or on the gas volume of the pressure accumulator in a measuring apparatus according to the present invention. This means that the pressure is not measured in the gas, but in the glue. In view of the fact that the glue is preferably an incompressible fluid, the pressure measured there corresponds to the pressure measured in the gas, so that it can be considered to represent the internal pressure in the pressure accumulator uniformly or substantially uniformly. This embodiment is no longer suitable for measuring pre-charge pressure, but in particular embodiments it does enable an even more compact construction and constitutes an alternative embodiment of a measuring apparatus according to the invention.

It may also be advantageous if, in a measuring apparatus according to the invention, the gas volume of the pressure accumulator is filled with a gas, particularly nitrogen, which undergoes only a small change in temperature in the event of pressure variations.

It is also advantageous if in a measuring apparatus according to the invention the pressure sensor for determining the internal pressure of the pressure accumulator is designed with a reference accuracy better than about 0.25%, particularly better than about 0.1%, and preferably better than about 0.08%. An ideal value is preferably about 0.075% for the pressure sensor. In this context, the term reference accuracy is understood to be the accuracy with which the internal pressure can be measured in the pressure accumulator. This is the maximum error deviation between the pressure measurement and the true pressure. The greater the accuracy of the pressure measurement, the more accurate is the input variable for the indirect determination of volumetric flow as well. The reduced probability of error thus also reduces the probability of error in the determination of volume flow. Thus, the stricter requirements on the pressure sensor make it possible to achieve greater accuracy in determining the volume flow rate with no additional effort for this purpose. In particular, if the determination is to be carried out as quickly and inexpensively as possible, the greater reference accuracy of the pressure sensor means that, for example, correction factors can be dispensed with when determining the volume flow rate of the glue.

It is also advantageous if in a measuring apparatus according to the invention at least one temperature sensor is provided for determining the temperature outside the measuring apparatus, in particular the ambient temperature. This temperature sensor is preferably located on one of the pipelines on the glue side, for example on the glue line of the gluing device. The temperature sensor serves to measure, calculate or estimate the actual ambient temperature. In this way, the volume flow of the glue can be determined yet more accurately when determination using the ideal gas equation. In particular, an additional input variable may be provided to this determination. Alternatively, that is to say without such a separate temperature sensor, a default value for the room temperature may be chosen, which may result in a lower degree of accuracy for determining the volume flow, although this lower degree of accuracy is still acceptable in some embodiments.

It may also be advantageous if in a measuring apparatus according to the invention the pressure equalization element is at least partly constructed as a flexible membrane. Such a construction offers the advantages of particularly simple and inexpensive design of the pressure equalization element. The flexible membrane may be at least partly made of an elastically deformable plastic. Even such a flexible membrane is usable for equalizing the pressure between the gas volume and the glue volume.

It is also advantageous if, in a measuring apparatus according to the invention, the glue port comprises at least one shut-off valve to shut off the flow of glue in the glue line. For this purpose, the glue port may comprise for example a T-union or T-valve as the shut-off valve. Thus, the glue port forms a part of the glue line, as it were. This enables existing systems to be equipped with the inventive functionality particularly easily and inexpensively. The operating functionality of such a shut-off valve will be explained in greater detail hereafter.

Another object of the present invention is a gluing device for an apparatus, particularly a bottoming device, or a tubing machine, for manufacturing bags or semifinished bag products. Such a gluing device is characterized by at least one measuring apparatus according to the present invention, which is connected to the glue port on a glue line of the gluing device. In other words, this is the combination of a measuring apparatus according to the invention with a new or an existing gluing device. Accordingly, the next larger unit for the present invention is created. In order to transport the glue, a positive displacement pump is preferably provided, which particularly functions by forced circulation. In this way the glue is transported automatically, and the measuring apparatus can be used with all the advantages described above for said measuring apparatus, and provide the corresponding advantages for the gluing device.

The gluing device according to the invention may be refined in such manner that a shut-off valve for shutting off the flow of glue is located before the glue port of the measuring apparatus when viewed in the direction of flow of the glue in the glue line. In this embodiment, the shut-off valve is arranged directly in the glue line and not in the glue port of the measuring apparatus. However, the operating functionalities in both arrangement variants are essentially identical. This valve is used in particular for carrying out the measurement with the aid of the measuring apparatus, as was explained above. If the shut-off valve closed, the further transport of the glue is in the subsequent glue line continues solely as a result of the residual pressure in the pressure accumulator. This is supplied from the pressure accumulator of the measuring apparatus. Thus, the transport of the glue may be continued without interruption, and at the same time the volume flow of the glue may be determined in the manner according to the invention on the basis of the ideal gas law as explained in the preceding. When the measurement is completed, that is to say the pressure has been determined at two points in time, the shut-off valve is opened again so that the flow of glue may be made available again, for example by a separate pump, for example. The pressure accumulator is then charged again up to the desired output pressure, about 20 bar, for example.

A gluing device according to the invention may be characterized in that a pressure control valve for controlling the glue pressure is located in the glue line after the glue port of the measuring apparatus when viewed in the direction of flow of the glue. Particularly with reference to the following application situation with application valves in an applicator head, a control capability may be provided here that is based in particular on input values of the measuring apparatus, that is to say on the determined volume flow of the glue. Accordingly, such a pressure control valve constitutes a part of the control system as it were.

It is also possible that, in a gluing device according to the invention the pressure accumulator has a volume that is configured in such manner that a residual pressure remains as the interior pressure in the pressure accumulator during the measurement cycle after the maximum glue discharge. This predefined residual pressure is greater than a pre-charge pressure, for example and in particular, for example, 16 bar. With a pre-charge pressure of 10 bar, for example, this would correspond to a residual pressure which is at least 60% above the pre-charge pressure. In the event of a pressure loss of 4 bar, for example, an outlet pressure or regular pressure of around 20 bar would thus be present.

Another object of the present invention is a method for determining the volume of glue in a gluing device of an apparatus, in particular a bottoming device, or a tuber machine, for manufacturing bags or semifinished bag products. An inventive method is characterized in that the internal pressure in a pressure accumulator is measured at least two different times and is calculated using at least two pressure values of the volume flow of glue that has flowed between the two points in time. An inventive method is preferably performed with an inventive measuring apparatus, in particular with an inventive gluing device. Preferably, isothermal determination of the volume flow can be carried out, as this enables the volume flow to be determined ever more easily.

An inventive method may be refined further in that a third pressure value is determined at least once, corresponding to the fill pressure of the pressure accumulator at room temperature. This increased pressure value is determined in particular at predefined intervals, for example once a day, so that possible deviations may be detected and the determination of the volume flow may be adapted appropriately.

It may also be advantageous if in a method according to the invention the result of the determination of the volume flow is converted to a corrected volume flow using a correction value. Particularly in operating situations that require special accuracy with regard to the calculated volume flow, this is advantageous. In this context, it is practical to employ a formula or function for the isothermal calculation and the corresponding correction value. A correction function that in particular is not linear may also be used. Thus, a measurement error in the determination of the volume flow, for example, in a range from about 15% to about 20% may be reduced to much lower values, from about 1% to about 2% for example. Accordingly, an inventive method brings the same advantages as have been described in detail with reference to a measuring apparatus of the invention and with reference to a gluing device according to the invention.

In a method according to the invention it is also advantageous if a predefined residual pressure remains as interior pressure in the pressure accumulator following the glue discharge in a measurement cycle, as was explained in the preceding with reference to gluing device.

BRIEF DESCRIPTION OF THE DRAWINGS

The present invention will be explained in greater detail with reference to the accompanying figures of the drawing. The terms "left", "right", "top" and "bottom" used in this section refer to an alignment of the drawing figures with human-readable numerals. In the schematic drawing.

DESCRIPTION OF SPECIFIC EMBODIMENTS OF THE INVENTION

Figure 1:
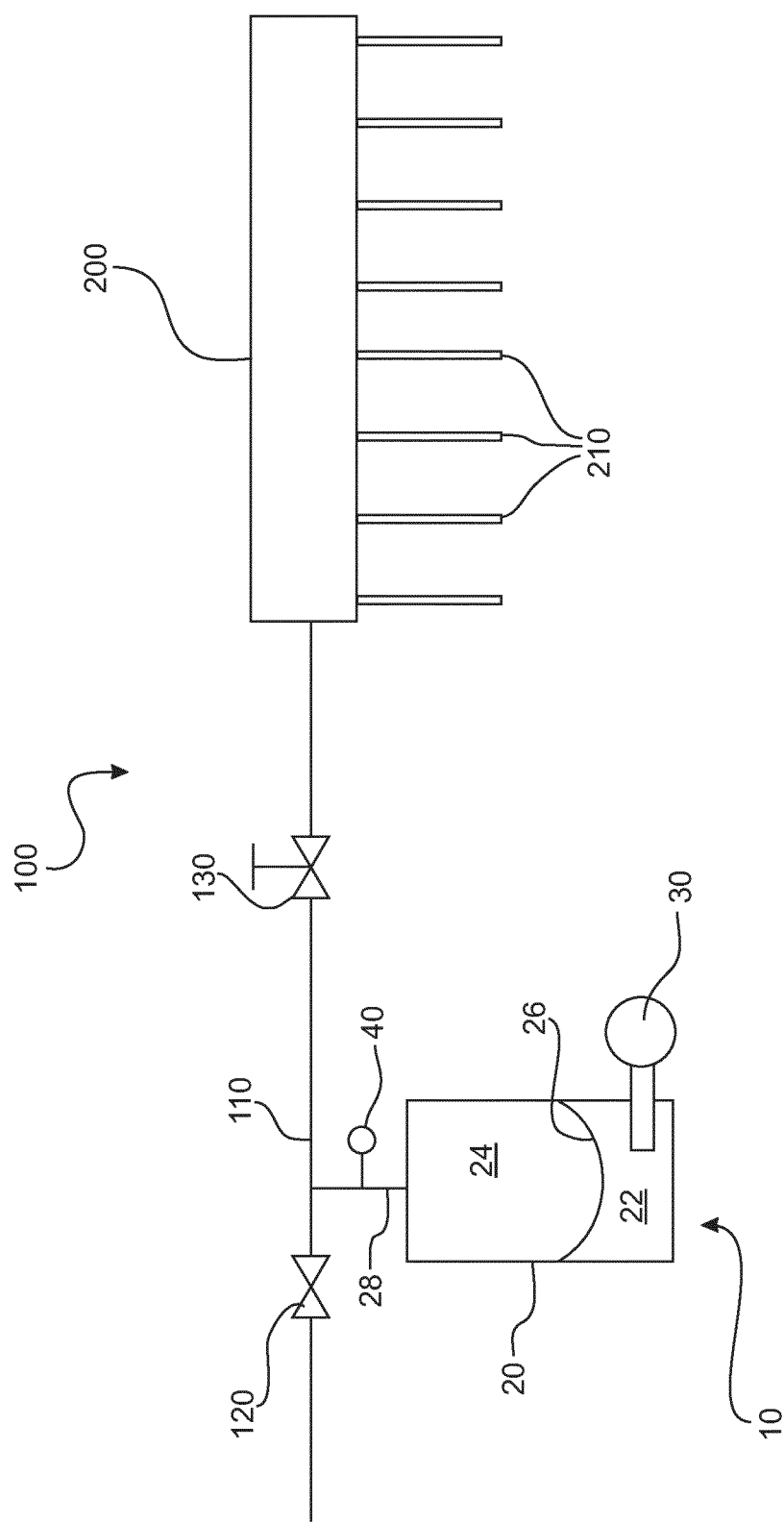
FIG. 1 shows a first embodiment of a gluing device according to the invention.

FIG. 1 shows a first embodiment of an inventive gluing device 100, which is particularly adapted for a device for manufacturing bags or semifinished bag products. This may be for example a bottoming device and/or a tuber machine. For this purpose an application head 200 with application valves 210 is provided, via which glue is to be applied to an appropriate substrate or material. In order to be able to control this glue in terms of the flow rate thereof, a pressure control valve 130 is disposed in a glue line 110 of gluing device 100. This pressure control valve 130 may be used to regulate the volume flow of the glue. In order to obtain the desired measurement values for the volumetric flow for this control system, a measuring apparatus 10 is provided.

Measuring apparatus 10 of said gluing device 100 is equipped with a pressure accumulator 20. A pressure equalization element 26, particularly the flexible membrane that flexibly separates a gas volume 22 from a glue volume 24 from each other is disposed inside said pressure accumulator 20. Glue volume 24 is connected to glue line 110 via a glue port 28. Pressure equalization element 26, particularly the flexible membrane, is flexible enough to cause the gas volume 22 and the glue volume 24 to change their sizes, particularly in correlation. IN addition, a pressure sensor 30 is provided that communicates with the internal pressure of pressure accumulator 20, and is able to measure it. In this embodiment, the pressure sensor is located outside of pressure accumulator 20 and is equipped with a probe that projects into the interior of gas volume 22. Thus, in this embodiment it is even possible to measure an empty glue volume 24, that is to say the precharge pressure of the pressure accumulator 20, which is particularly about 10 bar.

Gas volume 22 in said measuring apparatus 10 according to the invention is preferably filled with a gas that exhibits little temperature change in response to pressure change. This is preferably nitrogen.

Figure 2:
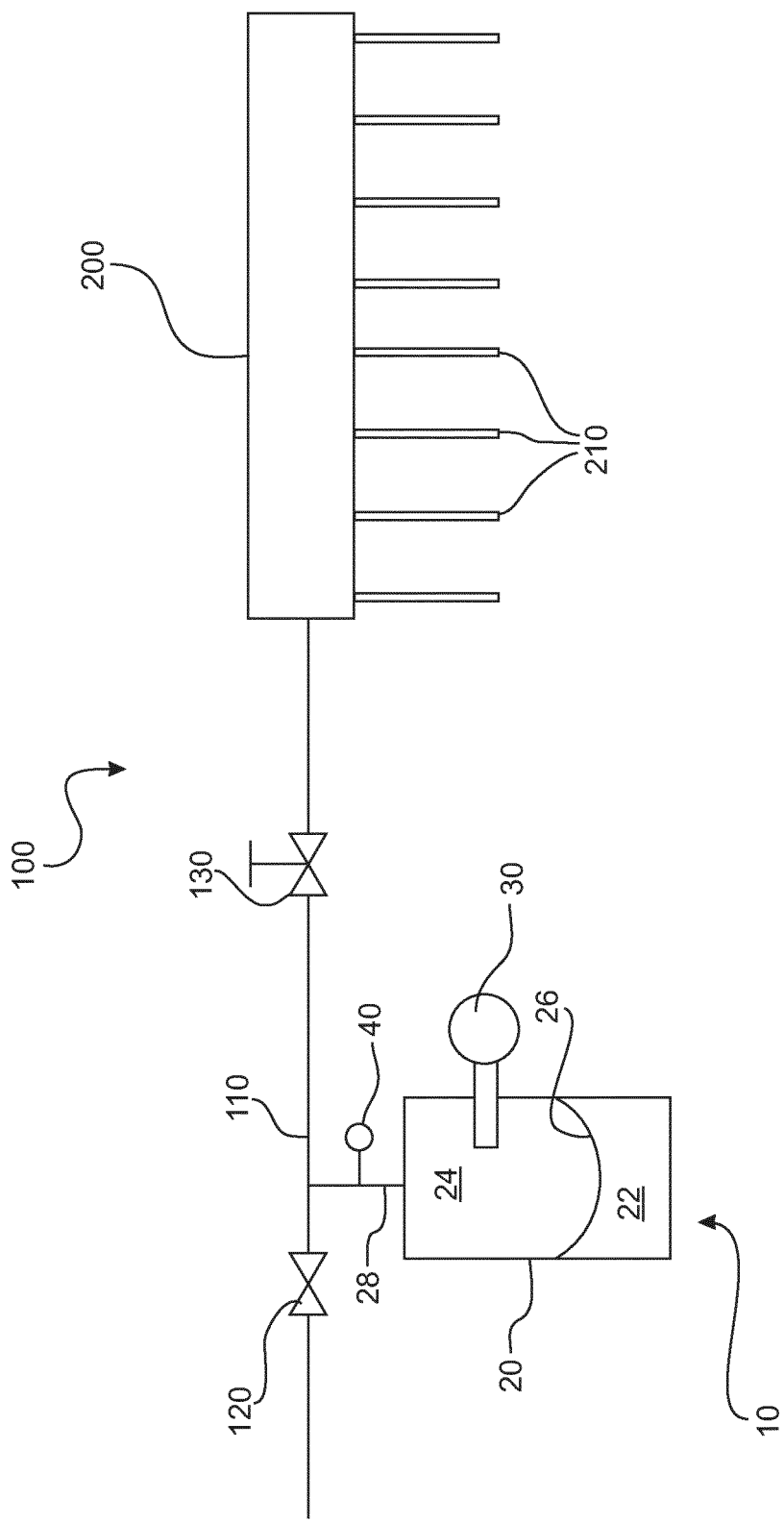
FIG. 2 shows a second embodiment of a gluing device according to the invention.

In the embodiment of FIGS. 1 and 2, gluing device 100 is further equipped with a shut-off valve 120, which enables glue line 110 to be shut off from a feed pump, which is not further shown. If said shut-off valve 120 is placed in the shut-off position, the subsequent transport of glue in glue line 110 downstream of shut-off valve 120 is assured solely by the residual pressure in pressure accumulator 20. For example, if the residual pressure is 20 bar, this pressure falls continuously due to ongoing transport, gas volume 22 increases, while glue volume 24 decreases and pressure equalization element 26, particularly the flexible membrane, shifts from bottom to top.

FIG. 2 differs from the embodiment of FIG. 1 in that a pressure sensor 30 is disposed at a different position of pressure accumulator 20. In this embodiment, the internal pressure in pressure accumulator 20 is measured directly via glue volume 24. However, there is no difference in the quality and/or the execution of the determination.

Figure 3:
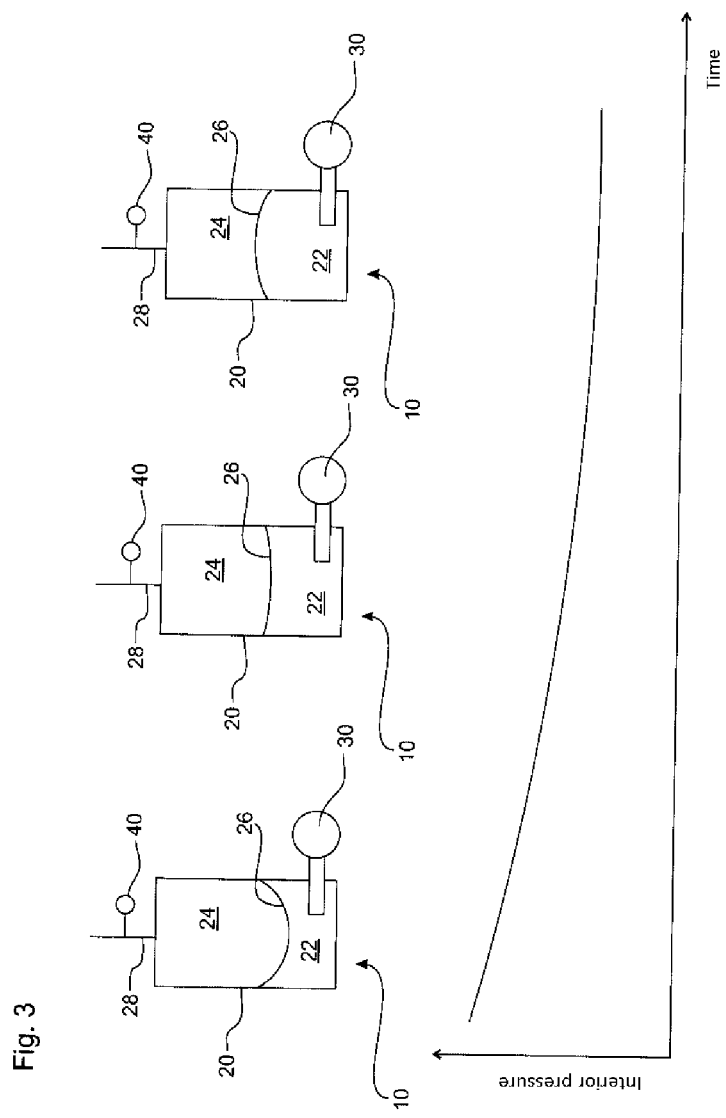
FIG. 3 shows the situation of a measuring apparatus according to the invention with different interior pressure states.

FIG. 3 shows one possible way to carry out the measurement for determining the volume flow. This occurs particularly when shut-off valve 120 (see FIGS. 1 and 2) is closed. Afterwards, the glue can only be transported by the residual pressure stored in pressure accumulator 20. The starting point for this is for example a situation such as is represented at far left in FIG. 3. Here, the internal pressure is still relatively high, and is about 20 bar, for example. Gas volume 22 is compressed, so that pressure equalization element 26, particularly the flexible membrane, is in its lowest position. The glue is not transported further, and the pressure in pressure accumulator decreases correspondingly, as may be seen in FIG. 3, in the internal pressure curve over time from left to right. Said decrease causes the gas in gas volume 22 to expand, so that pressure equalization element 26, particularly the flexible membrane, moves upwards until it reaches the end of this measurement cycle, as shown at far right in FIG. 3. Pressure equalization element 26, particularly the flexible membrane, is located in the uppermost position thereof and the pressure has decreased. The maximum pressure drop of a measurement cycle can be 4 bar, for example, so that the measurement is carried out between a first pressure of 20 bar and a final pressure of about 16 bar. Now, if the ideal gas law is applied under isothermal conditions, the volume change can be calculated from the pressure change. This change in volume and the measured time between the initial pressure and the final pressure are used to determine a volume flow for the glue that was transported during the measurement cycle. This may also be referred to as indirect determination or measurement of the glue volume flow in gluing device 100.

Figure 4:
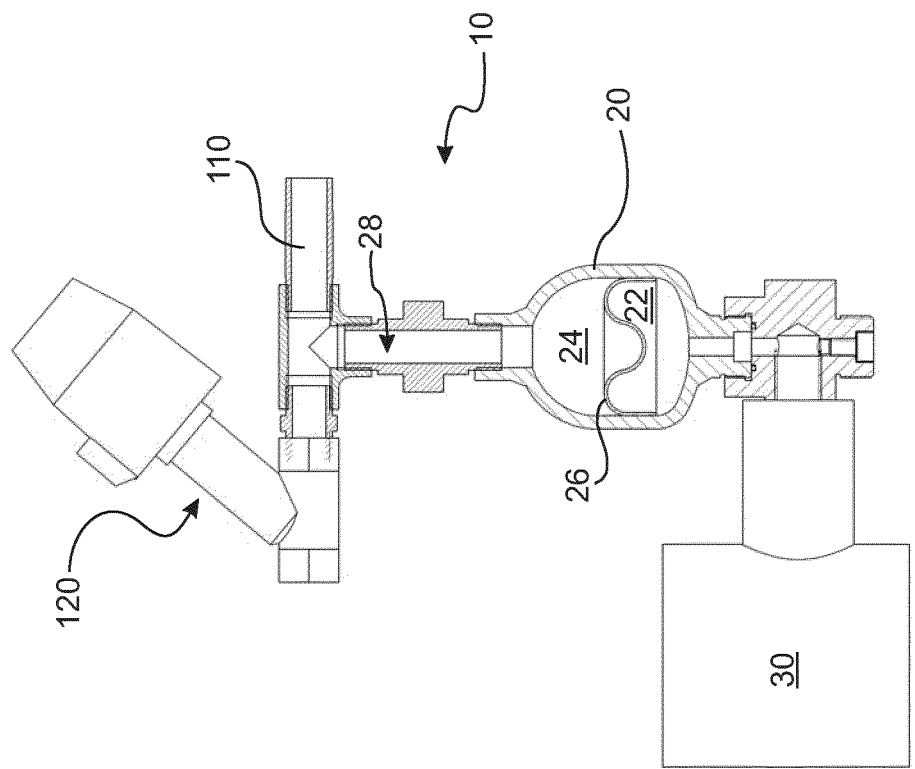
FIG. 4 shows another embodiment of a measuring apparatus according to the invention.

FIG. 4 shows another, more specific embodiment of a measuring apparatus 10 according to the invention, as may be used for example in a gluing device 100 according to FIGS. 1 and 2. It functions in the same or similar manner as was explained for FIG. 3. Here too, a shut-off valve 120 is in evidence and is provided upstream of a glue port 28 for a glue line 110. Measuring apparatus 10 is also provided with a pressure accumulator 20, which has a gas volume 24 and a glue volume 22. Glue volume 24 and gas volume 22 are separated from each other by a pressure equalization element 26, particularly the flexible membrane. Said pressure equalization element 26, particularly the flexible membrane, is particularly made from a rubber or plastic material. In addition, a connecting piece is provided that allows a pressure sensor 30 to be screwed in so that it is in pressure-fitting contact with gas volume 22 of said measuring apparatus 10.

The preceding explanations of the embodiments describe the present invention only in the context of examples. Of course, technical features of the individual embodiments may be combined with each other in any technically practicable permutation without departing from the scope of the present invention.

| List of reference signs | |
|---|---|
| 10 | Measuring apparatus |
| 20 | Pressure accumulator |
| 22 | Gas volume |
| 24 | Glue volume |
| 26 | Pressure equalization element |
| 28 | Glue port |
| 30 | Pressure sensor |
| 40 | Temperature sensor |
| 100 | Gluing device |
| 110 | Glue line |
| 120 | Shut-off valve |
| 130 | Pressure control valve |
| 200 | Application head |
| 210 | Application valve |

The invention claimed is:

1. Measuring apparatus (10) for determining the volume flow of glue in a gluing device (100) for a bottoming device or a tubing machine, for manufacturing bags or semifinished bag products, comprising:
 a pressure accumulator (20) having a gas volume (22) and a glue volume (24) that is separated from the gas volume (22) by a pressure equalization element (26), wherein the glue volume (24) comprises a glue port (28) for connection to a glue line (110) of the gluing device (100), and the pressure accumulator (20) comprises a pressure sensor (30) for determining the interior pressure in the pressure accumulator (20).

2. Measuring apparatus (10) according to claim 1, wherein the pressure sensor (30) is arranged in or on the gas volume (22) of the pressure accumulator (20).

3. Measuring apparatus (10) according to claim 1, wherein the pressure sensor (30) is arranged in or on the glue volume (24) of the pressure accumulator (20).

4. Measuring apparatus (10) according to claim 1, wherein the gas volume (22) of the pressure accumulator (20) is filled with a gas, particularly nitrogen, which only undergoes a small temperature change in response to changes in pressure.

5. Measuring apparatus (10) according to claim 1, wherein the pressure sensor (30) enables the interior pressure of the pressure accumulator (20) to be determined with a reference accuracy better than about 0.25%, particularly better than about 0.1% and preferably better than about 0.08%.

6. Measuring apparatus (10) according to claim 1, wherein at least one temperature sensor (40) is provided for determining the temperature outside the measuring apparatus (10).

7. Measuring apparatus (10) according to claim 1, wherein at least sections of the pressure equalization element (26) are constructed as a flexible membrane.

8. Measuring apparatus (10) according to claim 1, wherein the glue port (28) comprises as least one shut-off valve (120) for shutting of the flow of glue in the glue line (110).

9. Measuring apparatus (10) according to claim 8, wherein the shut-off valve (120) is closed for carrying out a measurement with the aid of the measuring apparatus (10).

10. Measuring apparatus (10) according to claim 8, wherein for carrying out the measurement a residual pressure transport is started from the pressure accumulator by the shut-off valve (120).

11. Measuring apparatus (10) according to claim 1, further comprising:
 a shut-off valve (120) is arranged before the glue port (28) of the measuring apparatus (10) viewed in the direction of flow of the glue in the glue line (110) in order to shut off the flow of glue.

12. Measuring apparatus (10) according to claim 1, further comprising:
 a pressure control valve (130) is arranged after the glue port (28) of the measuring apparatus (10) viewed in the direction of flow of the glue in the glue line (110) in order to regulate the pressure of the glue.

13. Measuring apparatus (10) according to claim 1, further comprising:
 the pressure accumulator (20) comprises a volume that is constructed in such manner that a predefined residual pressure remains as the interior pressure in the pressure accumulator (20) after the maximum glue discharge during a measuring cycle.

14. Measuring apparatus (10) according to claim 1, wherein a transport of the glue, by a positive displacement pump, is provided outside the measuring apparatus (10).

15. Method for determining the volume flow of glue in a gluing device (100) for a bottoming device or a tubing machine, for manufacturing bags or semifinished bag products, comprising:
 measuring interior pressure in a pressure accumulator (20) at least at two points in time,
 determining a volume flow of glue that has flowed between said points in time by a calculation supported by the aid of the at least two pressure values;
 wherein the pressure accumulator (20) having a gas volume (22) and a glue volume (24) that is separated from the gas volume (22) by a pressure equalization element (26), wherein the glue volume (24) comprises a glue port (28) for connection to a glue line (110) of the gluing device (100), and the pressure accumulator (20) comprises a pressure sensor (30) for determining the interior pressure in the pressure accumulator (20) or a gluing device (100) having at least one measuring apparatus (10) which is connected to the glue port (28) on a glue line (110) of the gluing device (100).

16. Method according to claim 15, further comprising:
 a third pressure value corresponding to a fill pressure of the pressure accumulator (20) at room temperature is determined at least once.

17. Method according to claim 15, further comprising a result of determining the volume flow is converted into a corrected volume flow by the application of a correction value.

18. Method according to claim 17,
 wherein the correction value is a correction function.

19. Method according to claim 15, wherein a predefined residual pressure remains as the internal pressure in the pressure accumulator (20) after the maximum glue discharge of a measuring cycle.

20. Method according to claim 15, further comprising a shut-off valve (120) closed for carrying out a measurement with the aid of the measuring apparatus (10).

* * * * *